(12) United States Patent
Woodhouse et al.

(10) Patent No.: US 8,029,038 B2
(45) Date of Patent: Oct. 4, 2011

(54) TABLE AND SEAT SYSTEM FOR A VEHICLE

(75) Inventors: David Woodhouse, Newport Coast, CA (US); Andrei Markevich, Aliso Viejo, CA (US); Christopher Wheeler, Newport Coast, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 11/972,969

(22) Filed: Jan. 11, 2008

(65) Prior Publication Data
US 2009/0179447 A1    Jul. 16, 2009

(51) Int. Cl.
B60N 2/12    (2006.01)

(52) U.S. Cl. .................. 296/63; 296/65.01; 296/37.14; 108/44

(58) Field of Classification Search ............ 296/68, 296/65.01, 65.05, 65.16, 69, 37.1, 37.5, 37.6, 296/37.14, 37.16, 1.07; 297/15, 217.7; 108/44; 362/485, 504, 512, 523, 549, 496, 427
See application file for complete search history.

(56) References Cited

U.S. PATENT DOCUMENTS

| | | | | |
|---|---|---|---|---|
| 2,228,203 A * | 1/1941 | De Hoffmann | ................ | 5/119 |
| 3,338,620 A * | 8/1967 | Cauvin | ................ | 296/37.14 |
| 3,394,666 A * | 7/1968 | Pearlman | ................ | 108/129 |
| 3,726,422 A * | 4/1973 | Zelin | ................ | 414/522 |
| 5,090,335 A * | 2/1992 | Russell | ................ | 108/44 |
| 5,521,806 A * | 5/1996 | Hutzel et al. | ................ | 362/486 |
| 5,857,741 A * | 1/1999 | Anderson | ................ | 297/170 |
| 6,145,447 A * | 11/2000 | Henderson | ................ | 108/44 |
| 6,196,612 B1 * | 3/2001 | Grimes | ................ | 296/65.05 |
| 6,474,715 B2 * | 11/2002 | Fukushima et al. | ................ | 296/37.1 |
| 6,641,190 B2 * | 11/2003 | Kirchhoff | ................ | 296/26.11 |
| 6,779,824 B1 * | 8/2004 | Lazarevich et al. | ................ | 296/50 |
| 6,935,064 B1 * | 8/2005 | Thompson | ................ | 42/94 |
| 7,066,516 B2 * | 6/2006 | Mulvihill et al. | ................ | 296/24.4 |
| 7,188,881 B1 * | 3/2007 | Sturt et al. | ................ | 296/26.1 |
| 7,207,616 B2 * | 4/2007 | Sturt | ................ | 296/26.1 |
| 7,309,202 B1 * | 12/2007 | Anderson | ................ | 414/537 |
| 7,354,090 B1 * | 4/2008 | Pomorski | ................ | 296/26.11 |
| 7,530,618 B2 * | 5/2009 | Collins et al. | ................ | 296/37.6 |
| D593,760 S * | 6/2009 | Fidler | ................ | D6/338 |
| 7,600,800 B2 * | 10/2009 | Suzuki | ................ | 296/37.16 |

* cited by examiner

*Primary Examiner* — Glenn Dayoan
*Assistant Examiner* — Pinel E Romain
(74) *Attorney, Agent, or Firm* — Frank A. MacKenzie; Brooks Kushman P.C.

(57) ABSTRACT

A passenger vehicle comprising a vehicle body and at least one seat is provided. The vehicle body includes a front end and a rear end. The seat is mounted within the rear end of the vehicle for translating from a first stowed position within the rear end of the vehicle to a first deployed position which is exterior to the vehicle.

3 Claims, 4 Drawing Sheets

TABLE AND SEAT SYSTEM FOR A VEHICLE

BACKGROUND

1. Technical Field

The embodiments of the present invention generally relate to a table and seat system in a motor vehicle.

2. Background Art

Passenger vehicles are known to include tailgates (or lift gates) positioned at a rear of the vehicle. Passenger vehicles equipped with tailgates also include a rear cargo region that is interior to the vehicle and positioned about the tailgate. The rear cargo region is generally utilized for storage purposes.

In general, vehicle occupants usually gather around the rear end of the vehicle before, during and after various entertainment events. Such events may include picnics, concerts, sporting events, etc. The most obvious type of gathering of occupants positioned about the vehicle consists of tailgating at football games. Often times these occupants may gather for hours about the rear of the vehicle consuming food and beverages. To facilitate such tailgating events, the rear cargo region is generally stocked with food, beverages, and chairs to allow occupants to sit comfortably within a group around the vehicle.

In some cases, the rear cargo region of vehicles may have limited storage capability, particularly in the area where a third row seating arrangement is needed to transport a large gathering of occupants to the event. In such a case, alternate storage mechanisms are needed to facilitate the storage of food, beverages, or other items generally brought to the entertainment events.

SUMMARY

In one embodiment, a passenger vehicle including a vehicle body and at least one seat is provided. The vehicle body includes a front end and a rear end. The seat is mounted within the rear end of the vehicle for translating from a first stowed position within the rear end of the vehicle to a first deployed position which is exterior to the vehicle.

In another embodiment, the vehicle body includes an interior with a rear cargo region that includes a load floor. The vehicle body includes a rear opening for providing access to the rear cargo region.

In yet another embodiment, a retractable table is mounted in the rear cargo region. The table defines a portion of the load floor in the rear cargo region for translating from a second stowed position within the rear cargo region to a second deployed position which is exterior to the vehicle.

In yet another embodiment, the table is configured for at least one of pivotal and slideable movement from the second stowed position to the second deployed position.

In yet another embodiment, a cooler is positioned below the table when the table is in the second stowed position.

In yet another embodiment, a lighting device is positioned with an interior section of a tailgate.

In yet another embodiment, the lighting device is extendable from the interior section of the tailgate for projecting light about the rear end.

In yet another embodiment, the lighting device includes a bezel, a reflector and at least one of a bulb and a light emitting diode (LED).

In yet another embodiment, the seat is positioned within a bumper fascia in the rear end of the vehicle.

In yet another embodiment, the seat slides from the first stowed position to the first deployed position.

In one embodiment, a passenger vehicle including a vehicle body and a retractable table is provided. The vehicle body includes a front end and a rear end. The vehicle body includes an interior with a rear cargo region that includes a load floor. The vehicle body includes a rear opening for providing access to the rear cargo region. The retractable table is mounted in the rear cargo region and defines a portion of the load floor in the rear cargo region for translating from a first stowed position within the rear cargo region to a first deployed position which is exterior to the vehicle.

In another embodiment, the table is configured for at least one of pivotal and slideable movement from the first stowed position to the first deployed position.

In yet another embodiment, a cooler is positioned below the table when the table is in the first stowed position.

In yet another embodiment, at least one seat is mounted within the rear end of the vehicle for translating from a second stowed position within the rear end of the vehicle to a second deployed position which is exterior to the vehicle.

In yet another embodiment, the seat slides from the second stowed position to the second deployed position.

In yet another embodiment, the seat is positioned within a bumper fascia in the rear end of the vehicle.

In yet another embodiment, a lighting device is positioned with an interior section of a tailgate.

In yet another embodiment, the lighting device is extendable from the interior section of the tailgate for projecting light about the rear end.

In yet another embodiment, the lighting device includes a bezel, a reflector and at least one of a bulb and a light emitting diode (LED).

In one embodiment, a passenger vehicle comprising a vehicle body, a retractable table, at least one seat and a retractable lighting device is provided. The vehicle body includes a front end and a rear end. The vehicle body includes an interior with a rear cargo region that includes a load floor. The vehicle body includes a rear opening for providing access to the rear cargo region. The retractable table is mounted in the rear cargo region and defines a portion of the load floor in the rear cargo region for moving from a first stowed position within the rear cargo region to a first deployed position which is exterior to the vehicle. The seat is mounted within the rear end of the vehicle for sliding from a second stowed position within the rear end of the vehicle to a second deployed position which is exterior to the vehicle. The retractable lighting device is mounted within the interior of the rear cargo region for projecting light about the rear end of the vehicle.

In another embodiment, the seat is positioned within a bumper fascia in the rear end of the vehicle.

DETAILED DESCRIPTION OF THE PREFERRED EMBODIMENT(S)

Figure 1:
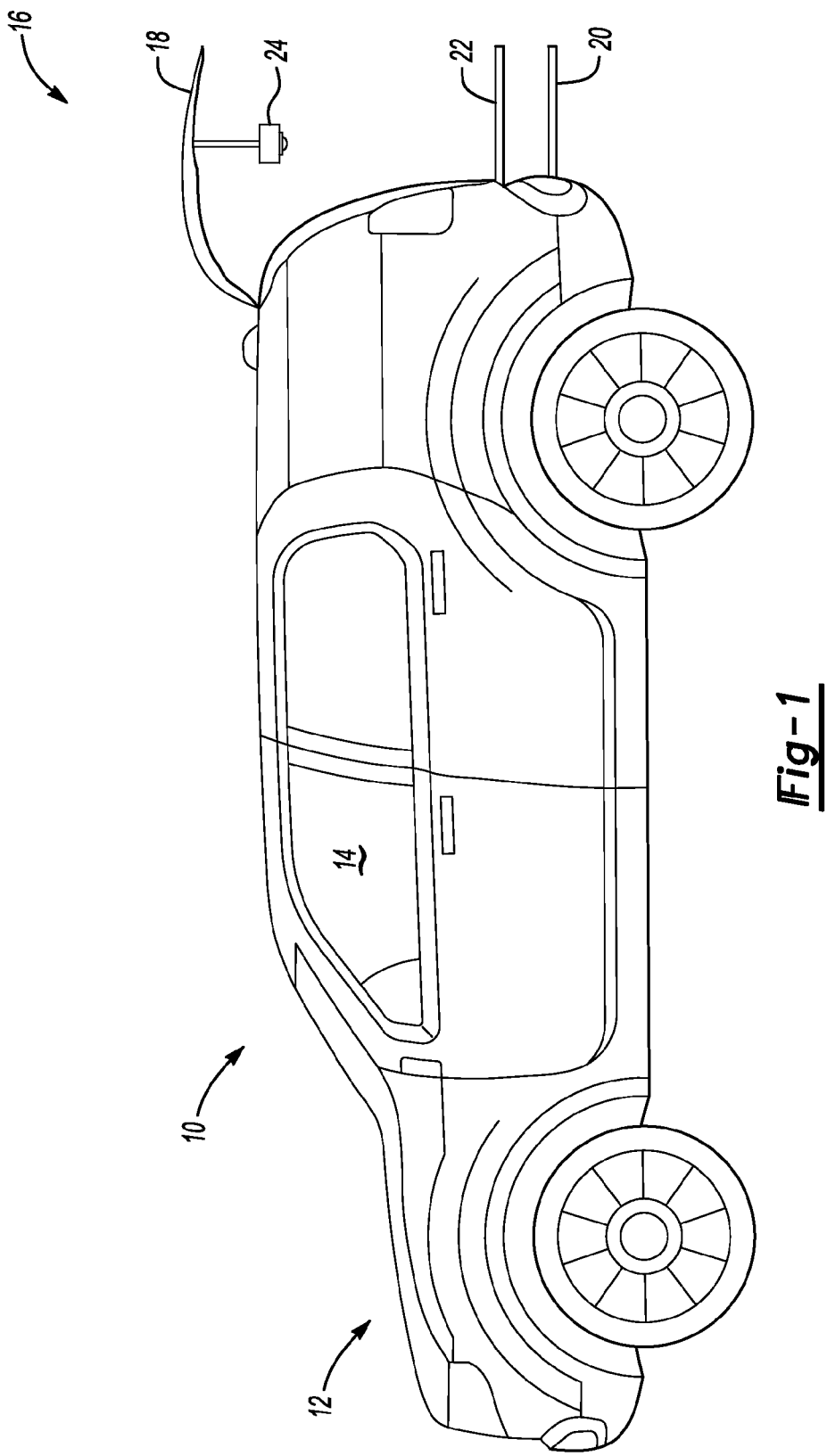
FIG. 1 is a perspective side view of a vehicle in accordance to one embodiment of the present invention.

Referring now to FIG. 1, a side view of a vehicle 10 is shown in accordance to one embodiment of the present invention. The vehicle 10 includes a front end 12, a driver side 14, a rear end 16, and a passenger side (not shown) positioned opposite to the driver side 14. A tailgate 18 is positioned about the rear end 16 and is pivotally coupled to a top section of the vehicle 10. A plurality of seats 20 slide out from the rear end 16 of the vehicle 10. A table 22 slides out of the rear end 16 of the vehicle 10. The seats 20 and the table 22 are generally configured to move in the fore and aft directions of the vehicle 10. A lighting device 24 is coupled to the tailgate 18 for projecting light for occupants positioned about the seats 20 and the table 22. The lighting device 24 may be retracted back into physical engagement with a cavity (not shown) on the tailgate 18. The lighting device 24 also provides light for an area interior to the vehicle 10.

Figure 2:
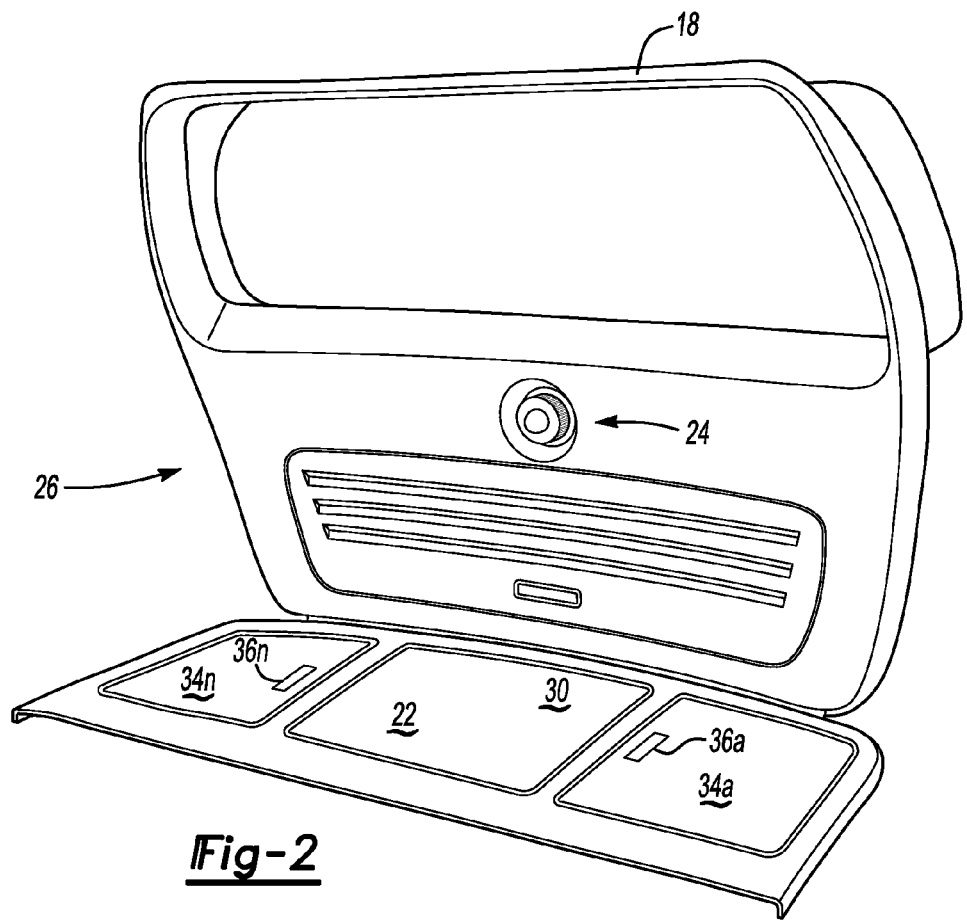
FIG. 2 is a perspective view of a rear cargo region of the vehicle of FIG. 1.

Referring now to FIG. 2, a rear cargo region 26 of the vehicle 10 is shown in accordance to one embodiment of the present invention. FIG. 2 illustrates the tailgate 18 in a closed state. The table 22 is in a stowed state. While in the stowed state, the table 22 forms a portion of the load floor 30. In one embodiment, a handle (not shown) may be disposed at one end of the table 22 to allow a user to manually pull the table 22 from the rear cargo region 26 out to the exterior of the vehicle 10 about the rear end 16 of the vehicle 10. In another embodiment, a switch, motor and controller may coact with each other for electronically deploying and retracting the table 22. The table 22 may have a rubber insulating cover or other suitable material formed thereon. Storage compartments 34a-34n may be positioned adjacent to the table 22. Top portions of the storage compartments 34a-34n form a portion of the load floor 30. Handles 36a-36n are positioned on the storage compartments 34a-34n for user manipulation.

The lighting device 24 is shown in a retracted position within the tailgate 18 and is capable of being extended to the exterior of the vehicle 10. In one example, to facilitate the extendable feature of the lighting device 24, cable 38 which electrically couples the lighting device 24 to a power source is provided to include a service length that is long enough to ensure the lighting device 24 is capable of providing sufficient lighting for occupants gathered about the seats 20 and the table 22 exterior to the vehicle 10.

Figure 3A:
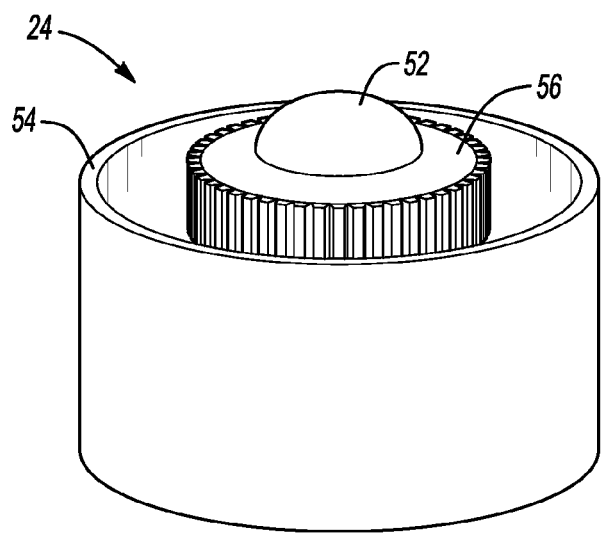
FIGS. 3*a*-3*b* are perspective views of the lighting device in accordance to one embodiment of the present invention.
Figure 3B:
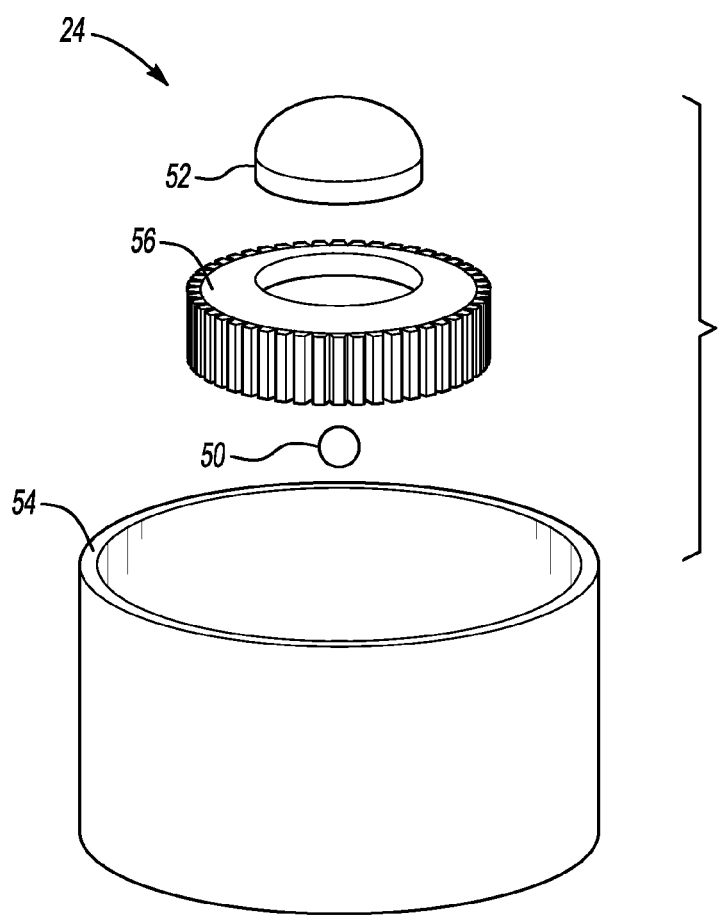

Referring now to FIGS. 3a-3b, the lighting device 24 is shown in accordance to one embodiment of the present invention. The lighting device 24 includes a light source 50. The light source 50 is operably coupled to a power source (not shown) for transmitting light. The light source 50 may be a light emitting device (LED), bulb or other such suitable lighting mechanism. A reflector 52 may be positioned over the light source 50 for directing the light away from the lighting device 24. The reflector 52 may be parabolic in shape or other such suitable shape. The shape of the reflector 52 may be shaped in any manner to provide for a wide dispersion of light or a concentrated light beam from the lighting device 24. A bezel 54 surrounds the light source 50 and the reflector 52. A knob 56 is positioned over the light source 50 and the reflector 52. A connector (not shown) couples the light source 50 to the power source. The knob 56 includes a plurality of grooves to facilitate user manipulation.

Figure 4:
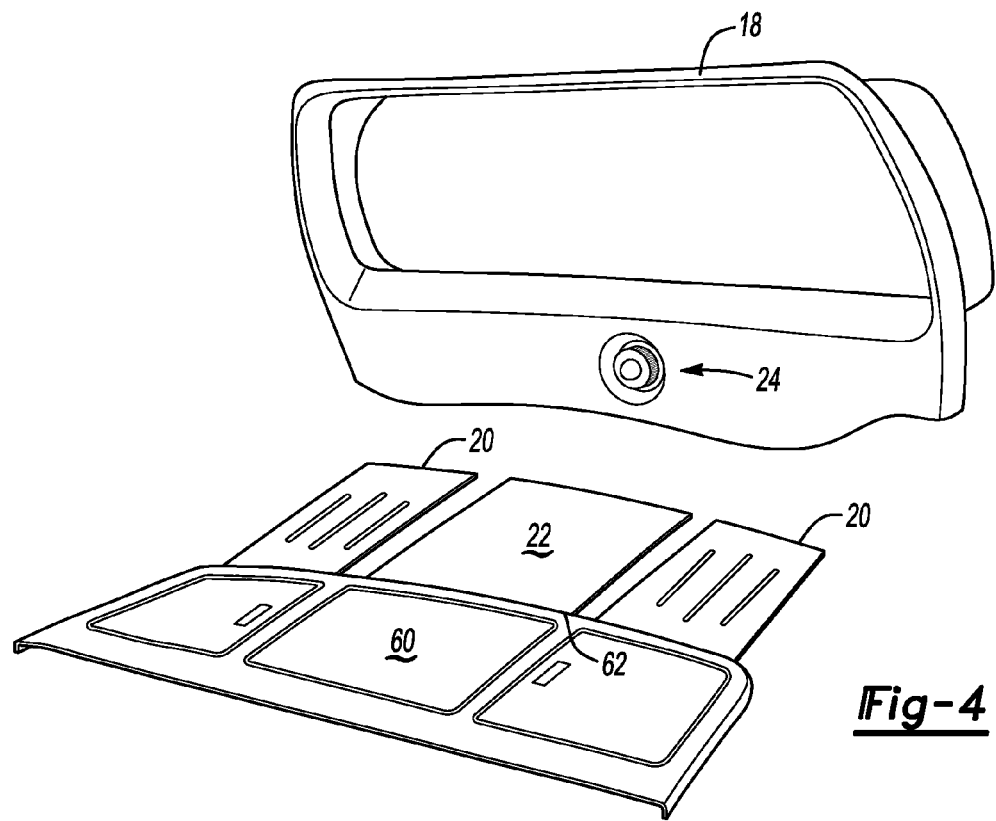
FIG. 4 is a perspective view of the rear cargo region of FIG. 2.

Referring now to FIG. 4, the rear cargo region 26 is shown in which the table 22 and the seats 20 are placed in unstowed positions. In one example, the seats 20 include handles (not shown) to allow occupants to manually pull the seats 20 from out of the rear end 16 of the vehicle 10. In another example, the seats 20 may be electrically driven to deploy and retract from and to the rear end of the vehicle. A cooler 60 is positioned in a compartment below the table 22 when the table 22 is in a stowed position. In general, the seats 20 are positioned at a lower height than that of the table 22 in the vehicle.

The seats 20 are positioned below the storage compartments 34a-34n. In one example, the table 22 and the seats 20 may each include a mechanical stop positioned at rear section of the seats 20 and table 22. The mechanical stops prevent the table 22 and the seats 20 from being fully disengaged from the rear end 16 of the vehicle 10. In another example, tracks may be positioned within the recesses which house the seats 20 when the seats 20 are in a stowed position. A bearing mechanism may be positioned one each side of each seat 20 for slideable engagement with the tracks. The tracks may also include a mechanical stop position thereon to interact with an interfacing mechanism (e.g., a blocking component) on the seat to prevent the seats 20 from becoming fully disengaged from the rear end 16 of the vehicle 10. Likewise, the table 22 may be adapted to include the bearing mechanism and the blocking component or other suitable mechanism that may be coupled to tracks positioned on the outer periphery of the load floor 30 which receives the table 22. Other such embodiments may include elongated channels formed within the recesses that store the seats 20 for slideably receiving the seats 20. The seats 20 may include mating edges at each end which slides against the channels of the recesses. In addition, the periphery of the load floor 30 may also include channels defined thereon for slideably receiving edges of the table 22.

The table 22 may also be pivotally coupled to the load floor 30. The table 22 may pivot about a pivot axis 62 such that the table 22 pivots toward the rear end 16 of the vehicle 10 to enter into a deployed position. To place the table 22 in a stowed position, the table 22 is pivoted forward towards the front of the vehicle 10.

Figure 5:
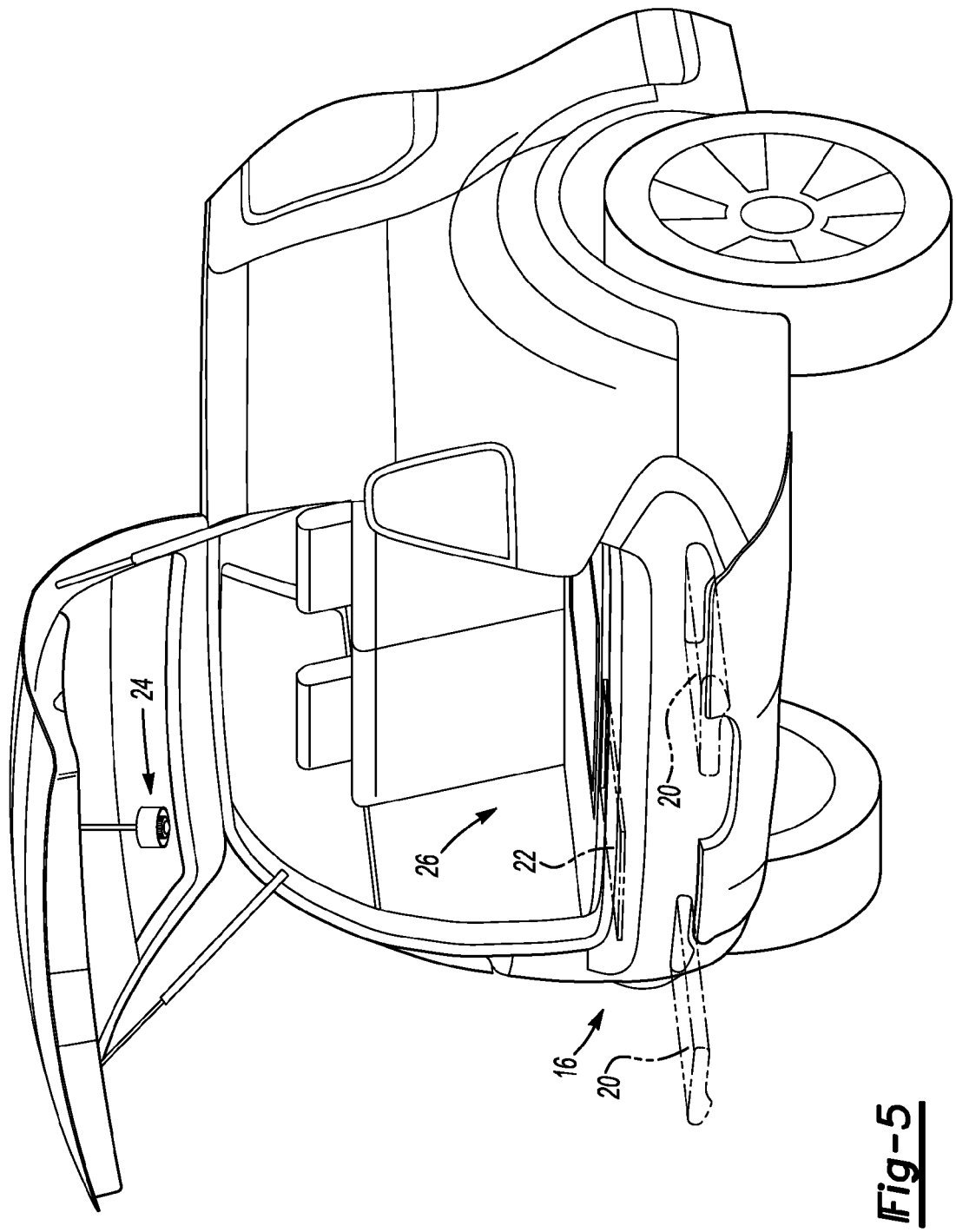
FIG. 5 is a perspective back view of the vehicle of FIG. 1.

Referring now to FIG. 5, the rear cargo region 26 and the rear end 16 of the vehicle 10 is shown in accordance to one embodiment of the invention. The seats 20 are shown in the stowed position within recesses of a rear bumper fascia positioned at the rear end 16 of the vehicle 10. The table 22 is also shown in the stowed position. The table 22 may slide from out of the rear cargo region 26 to an exterior position outside of the vehicle 10. The invention contemplates that a locking mechanism (not shown) (e.g., key and lock) may be used to lock the seats 20 in the recesses to prevent the seats 20 from sliding out from the rear of the vehicle 10 in the event the seats 20 are not electronically actuated for deployment and retraction. As seen, the visible portion of the seats 20 when stowed is generally flush with the fascia. In one example, the seats 20 may have a notch formed on an exterior portion to provide clearance so that an occupant may grab the handle 32 to pull out the seats 20.

In general, the embodiments of the present invention provide slideable seats and tables from the rear end 16 of the vehicle 10. The seats are positioned within the rear bumper fascia and are capable of being slid out manually and electronically. The table 22 is generally positioned in the rear cargo region and defines a portion of the load floor 30. Below the table 22, a cooler 60 may be stored to provide for additional storage capability. The table 22 is capable of deployment from the rear cargo region out to a position exterior to the vehicle 10 either manually or electrically. Further, the table 22 may retract from the exterior position of the vehicle to the rear cargo region 26 manually or electronically. A retractable lighting device 24 is provided on the tailgate 18 of the vehicle 10. The lighting device 24 illuminates the rear cargo region 26 of the vehicle 10 as well as an area exterior to the vehicle 10 where the seats 20 and the table 22 may be positioned when in unstowed positions.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A passenger vehicle comprising:
a vehicle body having a front end and a rear end, the vehicle body having an interior with a rear cargo region that includes a load floor, the vehicle body having a rear opening for providing access to the rear cargo region,
a retractable table mounted in the rear cargo region and defining a portion of the load floor in the rear cargo region for translating from a first stowed position within the rear cargo region to a first deployed position which is exterior to the vehicle body,
at least one seat including a first seat and a second seat mounted within the rear end and below the load floor for translating from a second stowed position within the rear end to a second deployed position which is exterior to the vehicle body, and
a bumper fascia in the rear end and defining a first opening and a second opening, the first opening for slideably receiving the first seat and the second opening for slideably receiving the second seat.

2. The passenger vehicle of claim 1 wherein the retractable table, when in the second deployed position, is positioned with the at least one seat when the at least one seat is in the second deployed position.

3. The passenger vehicle of claim 1 wherein the at least one seat slides from the second stowed position to the second deployed position.

* * * * *